July 5, 1955 R. D. HENDERSON 2,712,350
CIRCUMFERENTIALLY TRAVELING TYPE TIRE BEAD LIFTING TOOL
Filed July 29, 1952 3 Sheets-Sheet 3

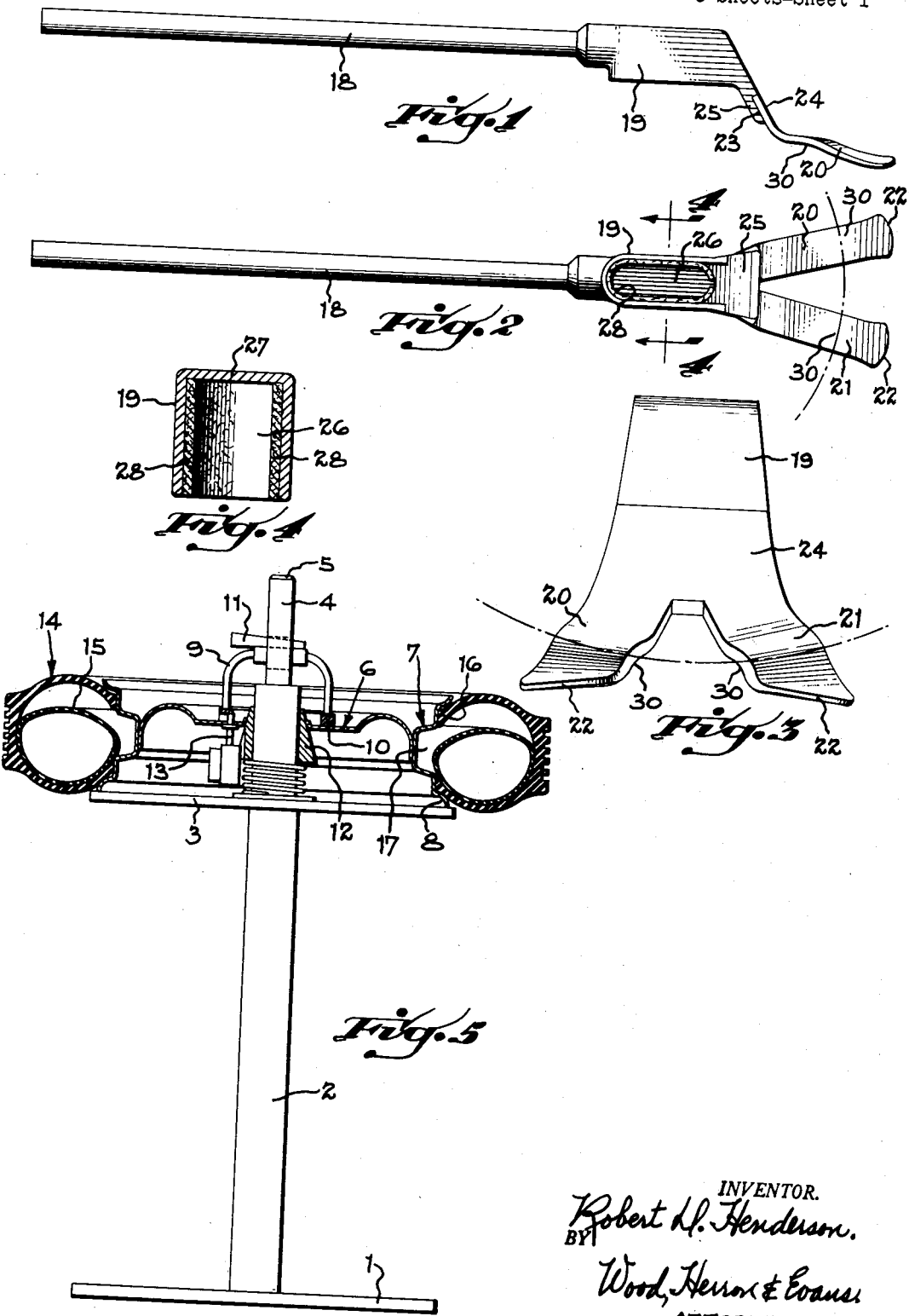

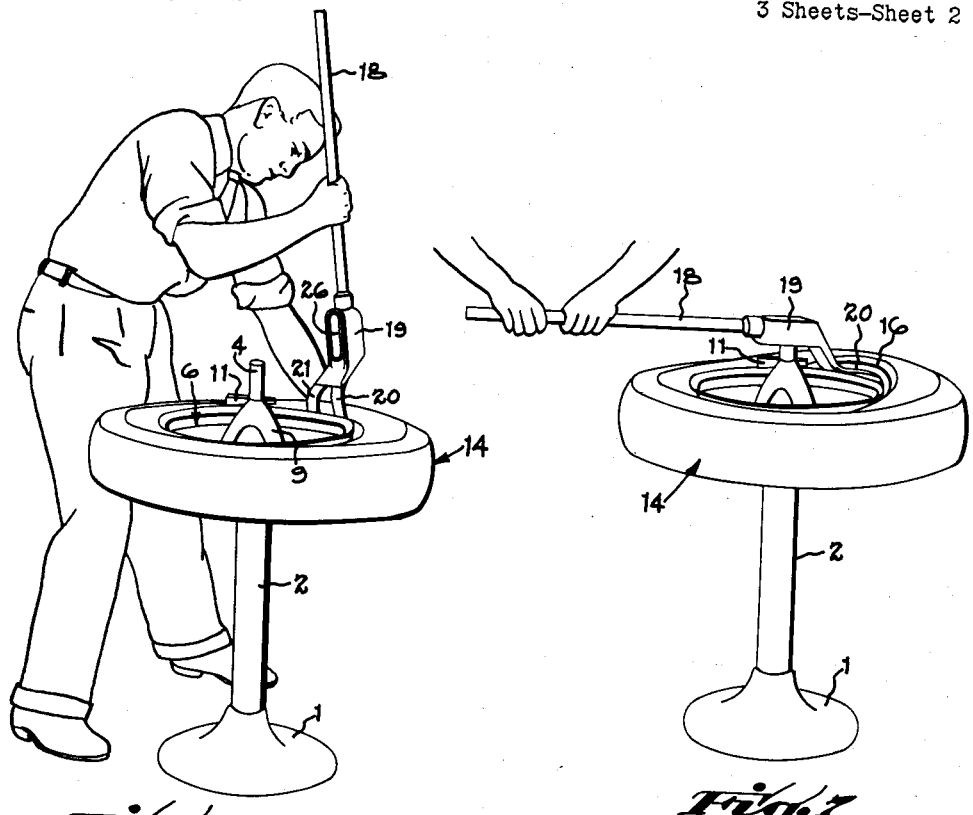
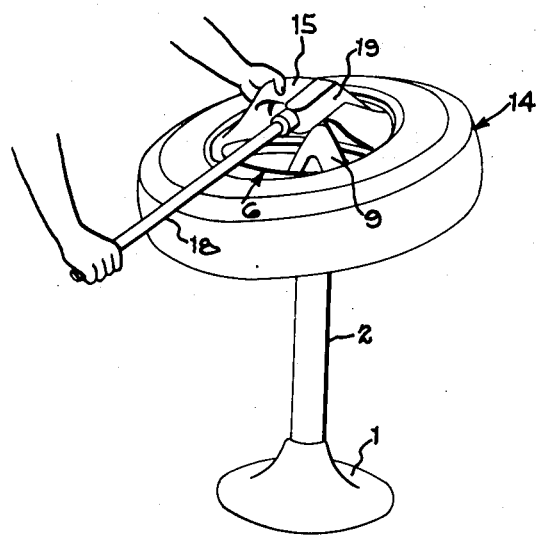

INVENTOR.
Robert D. Henderson.
BY Wood, Herron & Evans.
ATTORNEYS.

United States Patent Office 2,712,350
Patented July 5, 1955

2,712,350

CIRCUMFERENTIALLY TRAVELING TYPE TIRE BEAD LIFTING TOOL

Robert D. Henderson, Cincinnati, Ohio

Application July 29, 1952, Serial No. 301,513

3 Claims. (Cl. 157—1.22)

This invention relates to the demounting of pneumatic tires from wheel rims. The present application is a continuation-in-part of Robert D. Henderson United States patent application Serial No. 715,284, filed December 10, 1946, for "Axially Compressing Type, Tire Dismounting Apparatus," and issued on September 2, 1952 as United States Patent No. 2,609,039.

The conventional pneumatic tire for auto vehicles or the like consists of a casing having relatively stiff bead members at its inner periphery which engage flange portions at the rim of the vehicle wheel. In prolonged use of an inflated tire which is mounted in this manner, the beads tend to become "frozen" to the metal of the rim, and in demounting a deflated tire from a wheel rim, it is usually first requisite to "break" the beads from the rim, so that the casing is associated loosely with the rim. This is particularly true in the case of the "safety rim" where the beads are locked over a ridge to prevent the tire coming off in case of a blowout. After the beads are broken, it is requisite to lift the bead portions of the tire over the rim in order to completely disengage the tire casing from the rim. This invention particularly concerns a tool which is adapted to enable separation of the tire casing from the wheel by the lifting of the tire beads over the rim flange.

The tool of the present invention is adapted to be used in conjunction with a post or pedestal about which the wheel and associated tire are supported in substantially concentric relation thereto. The end of the post is spaced beyond one side of the wheel and constitutes a fulcrum and pivot point with respect to which the tool of the present invention is cooperable.

The tool itself comprises a fork member having spaced tines or blades which are engageable endwisely into the space between the tire bead and rim flange, an elongated handle which is adapted to be grasped manually for manipulation of the tool, and a box journal located between the forked blades and the handle for fulcrum and pivotal engagement with the end of the post or pedestal. The blades of the tool are divergent with respect to one another so that their tip or endwise portions engage the tire bead at spaced points thereon, and the general planes of the blades extend at an angle with respect to each other in the transverse or widthwise direction of the blades so as to approximate the curvature of the rim when the handle of the tool extends substantially diametrically across it on an incline toward the rim.

For insertion of the tool between the bead and wheel rim, it is applied, initially, along a path which is substantially lateral to the plane of the wheel and associated tire, e. g., if the wheel and tire are supported in a horizontal plane upon the post, the handle of the tool initially is held in a substantially vertical position for insertion between the rim and bead. By moving the handle angularly over the wheel from this position, the back faces of the blades engage the rim of the wheel while the bead of the tire is caught by the blades near the extremities thereof. The wheel rim, therefore, initially serves as a fulcrum for the blades, and the elongated handle provides a substantial mechanical advantage which is desirable in the initial phase of the lifting operation when the greatest force is required.

As the handle subsequently is swung downwardly, the box journal of the tool engages the top of the post and enables the tool to raise the bead above the rim. Meanwhile, rotation of the tool pivotally about the post causes the bead progressively to be lifted above the rim perimeter. In this manner, the first bead of the tire is demounted. The other bead may be removed in the same manner in the same or a successive operation.

A preferred construction of the tool of the present invention, and the way in which it is manipulated, is illustrated in the accompanying drawings in which:

Figure 1 is a longitudinal elevation of the tool;

Figure 2 is a bottom view looking upwardly at the bottoms of the blades and into the box journal;

Figure 3 is a face view looking at the ends of the blades;

Figure 4 is a cross sectional view taken on the line 4—4 of Figure 2;

Figure 5 is a sectional elevation of post or pedestal apparatus adapted to support a wheel while a tire casing is being removed from it with the tool of the present invention;

Figure 6 is a view showing the application of the tool between the tire bead and wheel rim at the start of a tire demounting operation;

Figure 7 is a view illustrating the prying and rotational movement of the tool for the progressive lifting of a bead over the rim flange;

Figure 8 is a view illustrating the lifting of a bead from the rim sufficiently to enable removal of the pneumatic innertube from the tire.

Figure 9:
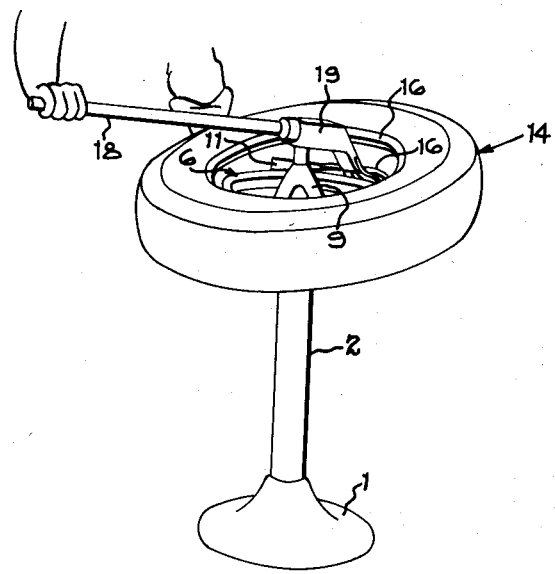
Figures 9 and 10 illustrate the successive steps of lifting the second bead from the rim and removing the entire casing from the wheel by a stripping movement.

To facilitate the demounting of a casing from a rim with the use of the tool of the present invention, it is desirable that the wheel be supported in a relatively rigid manner and that a post project to one side of the wheel substantially along the central axis thereof. Any suitable apparatus may be used for this purpose; that shown in Figure 5 is in accordance with my aforesaid patent application Serial No. 715,284, but it will be noted that the bead breaking jaws which are also disclosed therein have here been omitted. Thus, the support apparatus which is shown in Figure 5 comprises a base 1, a column 2, a table 3 extending rigidly from the column 2, and a post 4 which terminates in a fulcrum end 5.

The vehicle wheel, as shown in Figure 5, comprises a hub portion indicated generally at 6, and a rim portion indicated generally at 7. The shape of both will vary according to the designs of different manufacturers, but in all conventional designs of wheels, the rim terminates in a flange 8. Wheels also vary in diameter from twelve to sixteen inches more or less, and the table 3 is preferably so dimensioned that the rim flange 8 of a wheel of any size within this range may be rested facially upon it.

To hold the wheel upon the table, the post 4 may be slotted transversely to receive a U-shaped hold down clamp 9 having lower extremities 10 which abut the wheel face at the hub portion thereof. A wedge key 11, engageable in the transverse slot of the post, may be used to force the hold down tightly against the wheel. Also, to facilitate the centralizing of the wheel upon the table, a centering cone 12 may be employed, in conjunction with a pin 13 which is engageable through one of the wheel bolt apertures to hold the wheel from rotating. The hold down, centering, and pin locking apparatus just discussed may, if desirable, be constructed in accordance with my United States Patent No. 2,481,926, issued September 13, 1949, for "Self-Adjusting and Locking Wheel Supporting Devices," but these details form no part of the present invention and any other arrangement may be employed which is suitable to provide a fulcrum and pivot points for the tool and to hold the wheel in a substantial rigid manner while its tire is being removed.

The tire casing shown in Figure 5 is indicated generally at 14, and the associated innertube at 15. The innertube, of course, is deflated prior to demounting of a tire, and it is also assumed that the beads 16 of the tire have, if required, been "broken" or loosened from the rim flange 8 in any suitable manner prior to the use of the tool of the present invention. Thus, the tire shown in Figure 5 is relatively loose upon the rim and mild pressure exerted against a tire side wall will force the bead from the rim flange toward the drop center portion of the rim indicated at 17.

The tool of the present invention, as shown in Figures 1–4, comprises an elongated handle portion 18, a fulcrum and pivote socket or box portion 19, and forked lifting blades respectively designated 20 and 21. The lifting blades are leaf-like at their extremities so as to be relatively thin, but they are also preferably of substantial width. The extremities of the blades 20 and 21 may, if desirable, be of slight arcuate curvature as at 22, and the edges are blunted or rounded to prevent tearing or cutting of the tire carcass or the innertube.

Blades 20 and 21 are angularly divergent from one another and constitute the tines of a fork which is joined to the box portion 19 of the tool as at 23. The blades may be made of spring steel suitably tempered, and the box 19 may be in the form of a steel casting or forging to which the blades are welded, while the handle 18 may be of common pipe.

In the preferred construction, divergent blades 20 and 21 adjoin one another in a tail portion 24 which is bent upwardly for overlapping interconnection with an angularly downwardly extending projection 25 at the forward end of the socket box 19. Through this arrangement, the forward ends of the blades are offset from the axis of the handle 18, the blades also being inclined in a slight downward angle with respect to the handle.

Box or socket portion 19 of the tool has a socket recess 26 therein which is open at the bottom, that is, at the side of the tool from which blades 20 and 21 project. The recess is closed by a top wall 27 and the recess is elongated, as shown in Figure 2. In the preferred construction, the side and end walls of the socket recess are covered with a facing 28 which may be of leather, rubber, or other suitable wear-resistant cushioning material, and the overall dimensions are such that the endwise portion of the post 4 may be received within the socket recess 26 with the top wall 27 thereof resting on the end 5 of the post 4. Thus, the end of the post, when engaged by the tool in this manner, serves as a fulcrum point about which the tool may be operated angularly, and the socketing construction also enables the post to serve as a pivot shaft about which the tool may be rotated.

The distance through which the endwise portions of the blades 20 and 21 are offset from the axis of the handle 18 is generally governed by the height to which the end of the post 4 extends above a wheel mounted on the table 3, and may be varied as desired in any particular type of construction. In the tool which is illustrated, the offset is such that when the blade tips are in engagement with the bead, and the box 19 is socketed on the end of the post 4, the far end of the handle 18 is spaced well above the tire and wheel. This permits substantial lifting movement to be imparted to the blades at the one side of the tire before the handle comes into contact with the tire at the other side. This result also is facilitated, in the preferred construction, by inclining the blades at a slight angle downwardly with respect to the axis of the handle.

The back faces of the blades 20 and 21 may be provided with locating grooves or depressions 30 at the areas thereof which are intended to engage the rim of the wheel when the beads of the tire are caught upon the tips of the blades. This grooving helps the operator to insert the tool to proper depth within a tire so that in the subsequent swinging of the tool the box journal will meet with the top of the post 4. Thus, the approximate location of the flange of a wheel rim with respect to the grooves 30 is indicated by the dot-dash arc line in Figures 2 and 3. Also, in the forming of grooves 30 by bending the metal of the blades, corresponding rises are provided which, upon engaging the edges of a tire bead, provide an indication to the operator that the tip portions of the blades are located in proper bead-lifting positions.

The socket recess in box portion 19 is of substantial length so that great care in the insertion of the tool to precise depth within a tire is not required. The elongated nature of the socket permits the tool to be used for demounting tires from the wheels of varying diameters.

In the preferred construction, as shown in Figure 3, the endwise portions of the blades 20 and 21, e. g., from the grooves 30 to the tips, are pitched with respect to one another so as to conform approximately to the curvature of the wheel rim when the blade surfaces are positioned to serve as fulcrum points. In this manner, the blades bear over substantially their entire width upon the rim edge when the handle of the tool is inclined, substantially diametrically, over the wheel rim.

Initial application of the tool to a tire for demounting the same from the rim is shown in Figure 6. The operator, by exerting pressure on the side wall of the tire with his left hand, spreads the bead from the rim a distance sufficient to enable the blades 20 and 21 to be inserted in the recess so provided. This depth, as previously noted, may readily be determined by merely sliding the tool along the rim edge until the grooves 30 are aligned approximately with the rim edge. The tips of the blades 20 are now disposed beneath the bead. Next, the handle of the tool is swung downwardly, i. e., in a counter-clockwise direction according to Figure 6, until the box portion 19 is socketed upon the post 4. During this movement, blades 20 and 21 rest upon the edge of the rim 8 which serves as a fulcrum therefor, and the bead of the tire is lifted upwardly as the handle is swung downwardly. It will be observed that a substantial demounting advantage is obtained through the forked blade construction of the present invention; lifting pressure is exerted on the tire bead at two spaced points so that a substantial portion of the bead is raised, while the forces are distributed and the likelihood of damaging or cutting the bead is eliminated.

With the bead and tool disposed in the position shown in Figure 7, the operator next swings the tool rotationally about post 4 which acts as a pivot. The rotation may proceed in either direction. In this movement, the edge of that blade which is leading in respect to the direction of rotation causes bead portions underlying the rim to be lifted progressively and raised over the rim flange. Meanwhile, the trailing blade prevents re-entrance of previously lifted bead portions back into the rim, which might otherwise occur. Rotation is continued until all of the bead is raised over the rim in this manner. Usually, this is accomplished in only one portion of one revolution of the tool about the pivot post, since it is found that after a substantial part of the bead is lifted over the rim, the remaining underneath portion frees itself voluntarily.

With all of one bead of the tire lifted over the rim edge, as shown in Figure 8, the handle of the tool is now swung in a further downward direction during which the fulcrum point is at the point of engagement of the tool socket with the end 5 of the post 4. The leverage ratio is substantially less than it was when the blades were fulcrumed on the rim edge, but the movement at the blade tips is correspondingly greater and the operator, therefore, is enabled easily and conveniently to lift the side wall of a tire a distance sufficient to permit the innertube to be grasped and pulled out. This is shown in Figure 8. If necessary or desirable, the tool may also be swung rotationally so that the innertube can be withdrawn progressively from the casing.

Figure 10:
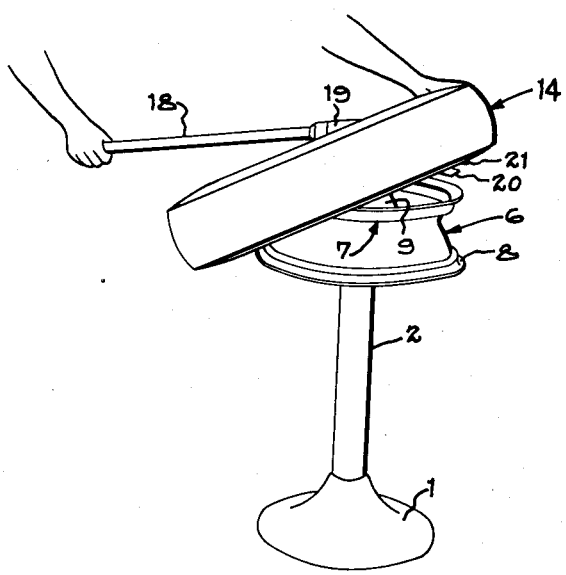

These operations complete the disengagement of one bead of a tire from the rim and disengagement of the tube from the casing. The remaining bead of the tire may be demounted from the rim in the same manner as that previously described in the demounting of the first bead. Such operation is illustrated in Figures 9 and 10 in which, it will be noted, the operator raises the tire with one hand so that the tips of the blades are caught upon the far bead of the casing. In a prying and turning motion of the handle, the second bead is lifted over the rim with subsequent rotational motion of the tool. Usually, the demounting of the first bead so loosens the tire on the wheel that the second bead may be demounted in a turning and prying motion of the handle as is shown in Figure 10. In some cases it is found that the tire is so loose upon the rim that both beads may be engaged and demounted simultaneously. Also, application of a lubricant such as soap solution overcomes the tendency of the tire rubber to hug the rim metal and thereby greatly facilitates all tire demounting operations. At no time in any of these demounting operations is any portion of the tire subjected to undue local stress which might result in cutting or tearing of the bead portion or other parts thereof.

Having described my invention, I claim:

1. A tire demounting tool comprising, an elongated handle, socket means at one end of said handle and a pair of blades extending from said socket means in diverging relationship to one another at opposite sides of the axis of the handle, the said blades being of substantial width, and being inclined with respect to the axis passing through said handle so that the tip extremities of said blades are offset substantially from the axis of said handle, the said blades having locating grooves formed thereon at the faces thereof which are on the same side of the tool as said socket means, the said locating grooves being spaced inwardly from the tip extremities of said blades to facilitate insertion of the blades to proper depth beneath the bead of a tire by engagement of the said locating grooves at the rim flange of a wheel upon which the tire is mounted.

2. A tire demounting tool comprising an elongated handle, socket means at one end of said handle and a pair of blades extending from said socket means on opposite sides of the axis of said handle, the said blades being of substantial width and having spaced extremities constituting prying surfaces adapted for engagement with the bead of a tire at spaced points thereon while inwardly spaced portions of said blades engage the rim flange of a wheel in fulcrum relationship thereto, the general planes of said blades extending at an angle with respect to one another in their widthwise directions to conform to the contour of the said rim flange of the wheel when the handle of said tool resides substantially diametrically across said wheel and at an angle with respect to the plane thereof.

3. A tire demounting tool comprising an elongated handle, a socket box at one end of said handle and a pair of blades extending rigidly from said socket box on opposite sides of the axis of said handle, the said blades being of substantial width and having spaced extremities constituting prying surfaces adapted for engagement with the bead of a tire at spaced points thereon while inwardly spaced portions of said blades engage the rim flange of a wheel in fulcrum relationship thereto, the said blades extending at an angle with respect to one another in their widthwise directions to conform to the contour of the said rim flange of the wheel when the handle of said tool resides substantially diametrically across said wheel and at an angle with respect to the plane thereof, the said blades also being inclined with respect to the handle axis whereby the extremities thereof are offset laterally from the handle axis.

References Cited in the file of this patent

UNITED STATES PATENTS

| | | |
|---|---|---|
| 602,252 | Beach | Apr. 12, 1898 |
| 1,341,727 | Weaver | June 1, 1920 |
| 1,569,310 | Trevorrow | Jan. 12, 1926 |
| 2,189,683 | Schultz | Feb. 6, 1940 |
| 2,471,642 | Moltz | May 31, 1949 |
| 2,547,976 | Rockwell | Apr. 10, 1951 |
| 2,569,789 | Weaver | Oct. 2, 1951 |
| 2,607,403 | Patterson | Aug. 19, 1952 |

FOREIGN PATENTS

| | | |
|---|---|---|
| 637,555 | Great Britain | Sept. 30, 1947 |
| 969,105 | France | Dec. 14, 1950 |